United States Patent
Mosquera et al.

(10) Patent No.: US 7,460,651 B2
(45) Date of Patent: Dec. 2, 2008

(54) CONTACT IDENTIFIER FOR MESSAGE TYPES

(75) Inventors: Dave Mosquera, West Chicago, IL (US); Carlo Bonifazi, Woodridge, IL (US); Nayel Saleh, Round Lake, IL (US); Eric James, Elgin, IL (US); Mary Ellen Moser, Warrenville, IL (US); Mike Sheridan, Oak Park, IL (US); Dave Wesen, Channahon, IL (US); Mike Hollatz, Huntley, IL (US); Mike Peters, Downers Grove, IL (US); David Funck, Wheaton, IL (US); Jeff Hodson, Wheaton, IL (US); Robert Beckstrom, Bolingbrook, IL (US); Anthony Dezonno, Bloomingdale, IL (US)

(73) Assignee: Rockwell Electronic Commerce Corp., Wood Dale, IL (US)

( * ) Notice: Subject to any disclaimer, the term of this patent is extended or adjusted under 35 U.S.C. 154(b) by 1050 days.

(21) Appl. No.: 10/320,002

(22) Filed: Dec. 16, 2002

(65) Prior Publication Data

US 2004/0114573 A1 Jun. 17, 2004

(51) Int. Cl.
*H04M 1/64* (2006.01)
(52) U.S. Cl. .................. 379/88.17; 379/88.13
(58) Field of Classification Search ............ 379/265.13, 379/266.02, 88.17; 370/352
See application file for complete search history.

(56) References Cited

U.S. PATENT DOCUMENTS

| | | | |
|---|---|---|---|
| 5,555,179 A | 9/1996 | Koyama et al. | |
| 5,627,764 A | 5/1997 | Schutzman et al. | |
| 5,680,551 A | 10/1997 | Martino, II | |
| 5,765,033 A | 6/1998 | Miloslavsky | |
| 5,917,489 A | 6/1999 | Thurlow et al. | |
| 5,926,539 A | 7/1999 | Shtivelman | |
| 5,928,330 A * | 7/1999 | Goetz et al. ................. | 709/231 |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,057,841 A | 5/2000 | Thurlow et al. | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |

(Continued)

*Primary Examiner*—Fan Tsang
*Assistant Examiner*—Simon Sing
(74) *Attorney, Agent, or Firm*—Husch Blackwell Sanders Welsh & Katz

(57) ABSTRACT

A method and apparatus are provided for routing a plurality of different types of Internet messages within a host to a plurality of agents. The method includes the steps of determining the message type of each of the plurality of different types of Internet messages and inserting a message type identifier into a packet of each message type of the plurality of different message types. The method further includes the steps of routing the packets to an Internet message distributor and distributing the messages within the Internet message distributor to the plurality of agents based upon the inserted message type identifier.

26 Claims, 1 Drawing Sheet

U.S. PATENT DOCUMENTS

| | | |
|---|---|---|
| 6,185,292 B1 | 2/2001 | Miloslavsky |
| 6,345,305 B1 | 2/2002 | Beck et al. |
| 6,373,836 B1 | 4/2002 | Deryugin et al. |
| 6,389,007 B1 | 5/2002 | Shenkman et al. |
| 6,389,132 B1 * | 5/2002 | Price .................. 379/265.01 |
| 6,393,015 B1 | 5/2002 | Shtivelman |
| 6,393,456 B1 | 5/2002 | Ambler et al. |
| 6,449,646 B1 * | 9/2002 | Sikora et al. ............... 709/226 |
| 6,732,156 B2 | 5/2004 | Miloslavsky |
| 6,985,576 B1 * | 1/2006 | Huck .................... 379/265.09 |
| 7,185,094 B2 * | 2/2007 | Marquette et al. .......... 709/225 |
| 2003/0041168 A1 * | 2/2003 | Musoll ...................... 709/238 |

* cited by examiner

CONTACT IDENTIFIER FOR MESSAGE TYPES

FIELD OF THE INVENTION

The field of the invention relates to the Internet and more particularly to methods of routing messages through the Internet.

BACKGROUND OF THE INVENTION

The use of the Internet as a communication medium between two or more parties is a well-known phenomenon. While e-mail is the best known of the Internet communication technologies, it is certainly not the only communication technology known. Other examples include video communication, facsimile transmission and Voice-over Internet Protocol (VoIP) communication.

In general, communication over the Internet involves the use of a browser and some sort of information resource. In the case of websites, a user may enter an Internet Protocol (IP) address of a website into his browser and receive information downloaded from the website.

In response to entry of the IP address of the website, the browser may send a query to the website. The server of the website, in turn, analyzes the query, retrieves the website IP address and the address of the originating browser. With the IP address of the website, the server may retrieve webpages from the website. With the IP address of the originating browser, the server may send the retrieved webpages to the originating browser.

In the case of VoIP, a voice conversion software module is used in conjunction with the browser. In effect, the VoIP module uses the browser as a voice communication channel between the user of the browser and a second user's browser at a second location. One difference between the use of a VoIP module and conventional browser operation is that the VoIP module continuously sends and receives voice packets while the browser ordinarily only sends packets under control of the user.

In order to set up a VoIP connection, one party to a conversation activates the VoIP module and enters an IP address of the other party through an interactive window. In response, the VoIP module forms a connection with a VoIP module of the other party to the conversation and the exchange of voice information begins.

E-mail, Video communication and facsimile transmissions occur through substantially similar methods. In each case, a software module works in conjunction with a user's browser to provide the functionality of the particular system in use. While such systems work relatively well, they are dependent upon the ability of the receiving party's browser to identify and process the information accordingly.

The Internet is becoming an increasingly more important medium of commerce. However, because of the diversity of software used to process Internet messages, organizations are often not equipped to process any more than one type of Internet communication at a time. Accordingly, a need exists for a method that allows an organization to process Internet messages under any of a number of different formats.

SUMMARY

A method and apparatus are provided for routing a plurality of different types of Internet messages within a host to a plurality of agents. The method includes the steps of determining the message type of each of the plurality of different types of Internet messages and inserting a message type identifier into a packet of each message type of the plurality of different message types. The method further includes the steps of routing the packets to an Internet message distributor and distributing the messages within the Internet message distributor to the plurality of agents based upon the inserted message type identifier.

DETAILED DESCRIPTION OF AN ILLUSTRATED EMBODIMENT

Figure 1:
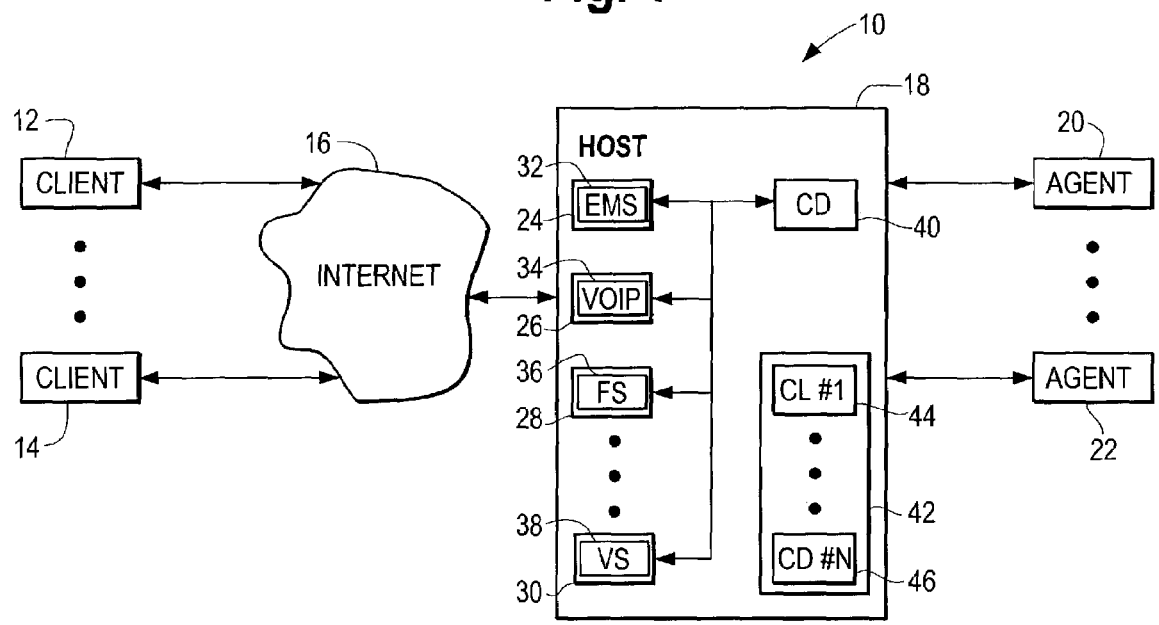
FIG. 1 is a block diagram of a system for routing a number of different Internet message types under an illustrated embodiment of the invention.

FIG. 1 is a block diagram of a message distribution system 10 shown generally in accordance with an illustrated embodiment of the invention. The message distribution system 10 may be used by any of a number of different organizations (e.g., commercial, political, environmental, etc.) to advance an agenda of the organization.

For example, a commercial organization may use the message distribution system 10 to deliver messages between clients and one of its agents for purposes of selling a product. A political or environmental organization may use the message distribution system 10 in a similar manner to influence voters or to educate clients as to the purpose of the organization.

As used herein, a message means an information transfer (e.g., voice, data, etc.) between a client 12, 14 and the message distribution center 10 through the Internet. The message distributor 40, in turn, may further exchange the message with an agent 20, 22 of the organization as described below. The information transfer may be either one-way or two-way, depending upon the circumstances.

Under the illustrated embodiment, the organization may promulgate, by advertising or otherwise, the IP addresses of any of a number of different communication ports 24, 26, 28, 30. For example, a first set of one more more IP addresses may identify a first port 24 that is intended for e-mail messages, a second set of IP addresses may identify a second port 26 that is intended for VoIP connections, a third set of IP address may identify a third port 28 intended for Internet facsimile transmissions and a fourth set of IP addresses may identify a fourth port 30 intended for video connections.

Associated with each of the ports 24, 26, 28, 30 may be a packet processor 32, 34, 36, 38 adapted to analyze each received packet from the Internet 16, to verify the content of each packet as being intended for the receiving port, to determine a message type and to reformat the packet for transmission to a message distribution processor 40. Formatting a packet in this case means adding a message type identifier that identifies the communication format of the message (e.g., e-mail, VoIP, fax, video, etc.). Formatting may also mean adding an address of the message distribution processor 40 to the packet.

Figure 2:
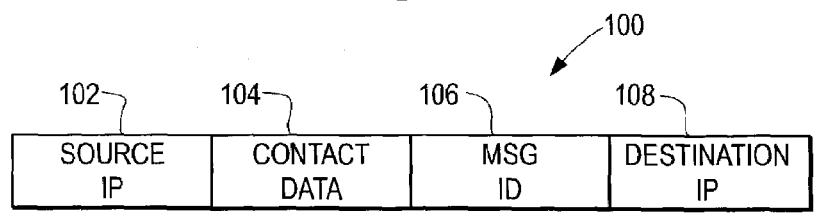
FIG. 2 is a packet format that may be used by the system of FIG. 1.

FIG. 2 depicts a packet 100 under the format (e.g., TCP/IP) provided by the processors 32, 34, 36, 38. As shown, the packet 100 may include a first field 102 that includes a source IP address, a second field 104 that includes contact data, a third field 106 that includes the message identifier and a fourth field 108 that includes a destination or intranet address of the message distributor 40.

The source IP address may be that of the client 12, 14, the contact data may provide the information content of the message and the message identifier may be the message format of contact data. The destination address may the address of the message distributor 40.

It should be noted in this regard that the message ID 106 may be any appropriate length (e.g., 32 bits) appropriate for the number of different message types to be expected. In the example given above, the message ID 106 would have a first predetermined value or prefix for VoIP, a second predetermined value or prefix for e-mail, a third predetermined value or prefix for fax messages, a fourth predetermined value or prefix for video and a fifth or higher predetermined value or prefix for other message types. The use of predetermined prefixes to identify the transmission format allows the use of suffixes for different message types within the same format.

The packet 100 may be formatted under any of a number of different processes. For example, packets received from clients 12, 14 may be forwarded to the message distributor 40 substantially as shown in FIG. 2. In this example, the destination IP address received from the client 12, 14 is deleted and replaced with the address of the message distributor 40. In addition, the message identifier 106 is inserted into the packet between the destination IP address 108 and the contact data 103.

Alternatively, the packet received from the client 12, 14 may be encapsulated along with other formation using Generic Routing Encapsulation (GRE) as defined by the Internet Engineering Task Force. In this case, the contact data 104 is the packet received from the client 12, 14. The destination IP address 108 of the GRE packet is the message distributor 40 and the source IP address 102 is the processor 32, 34, 36, 38 sending the GRE packet. The use of GRE may be used to preserve the original destination IP address within the packet received from the client 12, 14.

The preservation of the original destination IP address provided by the client 12, 14 may be used in cases where the organization provides a number of different IP addresses through any one or more ports 24, 26, 28, 30 for different functions and the message type identifier for each port does not have sufficient range to identify each destination. For example, where the organization is a commercial organization (e.g., a department store) a first e-mail IP address may be for hardware, a second e-mail address may be for ladies shoes, etc.

In each case, the ports 24, 26, 28, 30 may be capable of simultaneously handling relatively large numbers of communication transactions at any one instant. Further, at least some ports (e.g., 26, 30) may be structured for two-way exchanges of packets. As the packets of each new message are processed and sent to the message distributor 40, the ports 26, 30 and message distributor 40 may exchange session information for that message. The exchange of session information may be used to define a set of code plugs that the message distributor 40 and respective ports 26, 30 may use for exchanging packets during each respective message session between a selected agent 20, 22 and a particular client 12, 14. The use of session information and code plugs allows for the rapid exchange of information between a client 12, 14 and agent 20, 22 where the format of the session (e.g., for VoIP, video, etc.) requires the rapid exchange of information between a client 12, 14 and agent 20, 22.

Upon receipt of a packet 100, the message distributor 40 decodes the packet 100 to retrieve the message identifier 106 and other information (e.g., the original destination IP address from the client 12, 14). Based upon the message identifier, the message distributor 40 may identify an agent 20, 22 qualified to handle the message.

The determination of the qualification of an agent 20, 22 to handle a message may be based upon any of a number of different criteria. For example, under a first criteria, the determination may be based upon the agent having the proper software (e.g., VoIP, video, e-mail, fax, etc.) capable of processing the message. As used herein, processing the message means converting the message into a format that is understood through one of the senses of the agent 20, 22 (e.g., hearing, sight etc.). For example, processing a VoIP message means forming a voice connection between the client 12, 14 that initiated the contact and selected agent 20, 22 through the Internet 16. Processing a video message means forming a video and voice connection between a terminal of the client 12, 14 that initiated the contact and a terminal of the selected agent 20, 22 through the Internet 16. Processing an e-mail or fax message means displaying the e-mail or fax message on a display that allows the agent 20, 22 to perceive and read the message.

Agent selection may also be based upon the destination IP address from the client 12, 14. For example, in the case of the department store discussed above, some agents 22, 24 may be more qualified than others in handling calls directed to hardware and would be given messages directed to that destination IP address preferentially over those agents who were not as qualified.

Alternatively, the message distributor 40 may also retrieve the source IP address and attempt to match the source IP address with IP addresses of existing clients 44, 46 within a database 42. Where a source IP address is matched with an existing client 12, 14, an agent 20, 22 who had previously serviced that client 12, 14 may be selected by the message distributor 40.

Once an agent 20, 22 is selected, the message distributor 40 may transfer the message to the selected agent 22, 24. The message distributor 40 may transfer the message by again reformatting the message in a manner similar to that discussed with respect to processors 32, 34, 36, 38. For example, the message distributor 40 may encapsulate the original message (e.g., using GRE) and forward the message to the address of the selected agent 22, 24. Where GRE is not used (or in conjunction with GRE), the message distributor 40 may exchange session information with the terminal of the selected agent 22, 24 and may set up a set of code plugs to exchange packets in response to VoIP or video messages. Where code plugs are used, the selected agent 20, 22 may engage in end-to-end communication with the client 12, 14 through the respective set of code plugs.

Once the selected agent 22, 24 receives the message from the distribution processor 40, the selected agent 22, 24 may begin conversing with the client 12, 14. During the conversation, the selected agent 22, 24 may retrieve and make entries to client records 44, 46 within the database 42.

In another embodiment of the invention where GRE is used, the original packet message from the client 12, 14 is simply embedded within a larger packet and forwarded, first from one of the ports 26, 28, 30, 32 to the message distributor 40 along with a message identifier. As a second step, the message may then be forwarded from the message distributor 40 to the selected agent 22, 24. When the terminal of the selected agent receives the packet, the terminal simply unpacks the original message from the client 12, 14 and acts upon the message accordingly. In this case, the terminal of the agent 22, 24 may simply bypass the message distributor 40 and ports 26, 28, 30, 32 and exchange packets directly with the client 12, 14 through the Internet 16.

The use of the message distribution system 10 greatly simplifies message distribution within the host 18 by reducing the overhead associated with the many different message types. In order to process different message types, prior art devices have needed to incorporate and use substantial portions of the message processing modules to determine a message type. By segregating message types to predetermined ports, and incorporating a message type identifier, a message distribution processor 40 is able to quickly and easily determine a message type and distribute messages without significant processing burden.

A specific embodiment of a method and apparatus for distributing Internet messages based upon an open architecture has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of routing a plurality of different types of incoming Internet packetized messages within a host to a plurality of agents, such method comprising the steps of:
    determining the message type of each of the plurality of different types of incoming Internet packetized messages arriving at the host from an Internet;
    inserting a message type identifier which identifies media type of the incoming message into a pre-existing packet of each message type of the plurality of different message types;
    routing the packets to an Internet message distributor; and
    distributing the messages within the Internet message distributor to the plurality of agents based upon the inserted message type identifier.

2. The method of routing messages as in claim 1 wherein the plurality of different types of Internet messages further comprises a voice over Internet protocol (VoIP) message.

3. The method of routing messages as in claim 1 wherein the plurality of different types of Internet messages further comprises at least one of a facsimile transmission message, a video message and an e-mail.

4. The method of routing messages as in claim 1 further comprising receiving the incoming message at a plurality of dedicated ports each having at least one unique IP address, and at least one port of the plurality of ports dedicated to each different type of incoming message.

5. The method of routing messages as in claim 4 further comprising associating a packet processor with each respective port, each packet processor adapted to analyze each Internet message received to verify each message as being intended for the respective port and to insert the message type identifier.

6. The method of routing messages as in claim 1 further comprising providing a respective server within the host for each of the plurality of different types of messages.

7. The method of routing messages as in claim 1 wherein the step of inserting a message type identifier into a packet of each message type of the plurality of different message types further comprises encapsulating the message type indentifier and a packet of each message of each message type into a larger packet and preserving an original destination IP address.

8. The method of routing messages as in claim 1 wherein the step of encapsulating the message type indentifier and a packet of each message of each message type into a larger packet further comprises using Generic Routing Encapsulation.

9. The method of routing messages as in claim 1 wherein the step of inserting a message type identifier into a packet of each message type of the plurality of different message types further comprises including a prefix identifying a particular transmission format.

10. The method of routing messages as in claim 1 wherein the step of inserting a message type identifier into a packet of each message type of the plurality of different message types further comprises including a suffix identifying a message type under the particular transmission format.

11. An apparatus for routing a plurality of different types of incoming Internet packetized messages within a host to a plurality of agents, such apparatus comprising:
    means for determining the message type of each of the plurality of different types of incoming Internet packetized messages arriving at the host from the Internet;
    means for inserting a message type identifier which identifies media type of the incoming message into a pre-existing packet of each message type of the plurality of different message types;
    means for routing the packets to an Internet message distributor; and
    means for distributing the messages within the Internet message distributor to the plurality of agents based upon the inserted message type identifier.

12. The apparatus for routing messages as in claim 11 wherein the plurality of different types of Internet messages further comprises a voice over Internet protocol (VoIP) message.

13. The apparatus for routing messages as in claim 11 wherein the plurality of different types of Internet messages further comprises at least one of a facsimile transmission message and a video message.

14. The apparatus for routing messages as in claim 11 wherein the means for determining the message types further comprises a plurality of dedicated ports, each for receiving a different type of message based upon IP addresses, and wherein at least one of the ports has multiple IP addresses and is dedicated to one message type.

15. The apparatus for routing messages as in claim 11 wherein the plurality of different types of Internet messages further comprises e-mail.

16. The apparatus for routing messages as in claim 11 further comprising means for providing a respective server within the host for each of the plurality of different types of messages.

17. The apparatus for routing messages as in claim 11 wherein the means for inserting a message type identifier into a packet of each message type of the plurality of different message types further comprises means for encapsulating the message type indentifier and a packet of each message of each message type into a larger packet, and wherein a selected agent of the plurality of agents communicates directly over an Internet with a caller by using information in the message packets encapsulated by the means for encapsulating.

18. The apparatus for routing messages as in claim 11 wherein the means for encapsulating the message type identifier and a packet of each message of each message type into a larger packet further comprises means for using Generic Routing Encapsulation.

19. The apparatus for routing messages as in claim 11 wherein the means for inserting a message type identifier into a packet of each message type of the plurality of different message types further comprises means for including a prefix identifying a particular transmission format.

20. The apparatus for routing messages as in claim 11 wherein the means for inserting a message type identifier into a packet of each message type of the plurality of different message types further comprises means for including a suffix identifying a message type under the particular transmission format.

21. An apparatus for routing a plurality of different types of incoming Internet packetized messages within a host to a plurality of agents, such apparatus comprising:
   a plurality of dedicated ports each having at least one IP address, and each dedicated to receiving a different message type based upon the IP address;
   a packet processor associated with each dedicated port adapted to insert a message type identifier which identifies a message type of the incoming message into a pre-existing packet of each message type of the plurality of different message types; and
   an Internet message distributor adapted to distribute the messages within the Internet message distributor to the plurality of agents based upon the inserted message type identifier.

22. The apparatus for routing messages as in claim 21 wherein the plurality of different types of Internet messages further comprises a voice over Internet protocol (VoIP) message.

23. The apparatus for routing messages as in claim 21 wherein the plurality of different types of Internet messages further comprises a facsimile transmission message.

24. The apparatus for routing messages as in claim 21 wherein the plurality of different types of Internet messages further comprises a video message.

25. The apparatus for routing messages as in claim 21 wherein session information is exchanged to define a set of code plugs for use in exchange of message packets during respective message sessions between a selected agent and a caller.

26. A method of routing a plurality of different types of incoming Internet packetized messages arriving at an Internet message center, such method comprising the steps of:
   providing a respective server for each type message of the plurality of different types of incoming packetized messages received at the Internet message center;
   routing each type of incoming message arriving at the message center to the respective server of the message type;
   inserting using the respective server a message type identifier which identifies a media type of the incoming message into a pre-existing packet of the message;
   routing the packets to a message distributor of the plurality of different types of messages; and
   distributing the messages within the message distributor based upon the message identifier.

* * * * *